US009058063B2

(12) United States Patent
Marks et al.

(10) Patent No.: US 9,058,063 B2
(45) Date of Patent: Jun. 16, 2015

(54) TRACKING SYSTEM CALIBRATION USING OBJECT POSITION AND ORIENTATION

(75) Inventors: Richard Lee Marks, Pleasanton, CA (US); Eric Larsen, Foster City, CA (US)

(73) Assignee: SONY COMPUTER ENTERTAINMENT INC., Tokyo (JP)

(*) Notice: Subject to any disclaimer, the term of this patent is extended or adjusted under 35 U.S.C. 154(b) by 704 days.

(21) Appl. No.: 12/789,358

(22) Filed: May 27, 2010

(65) Prior Publication Data

US 2010/0302378 A1    Dec. 2, 2010

Related U.S. Application Data

(60) Provisional application No. 61/182,702, filed on May 30, 2009.

(51) Int. Cl.
| | |
|---|---|
| H04N 5/225 | (2006.01) |
| G06F 3/03 | (2006.01) |
| G01S 3/78 | (2006.01) |
| G01S 3/784 | (2006.01) |
| G06F 3/0346 | (2013.01) |

(52) U.S. Cl.
CPC ............. *G06F 3/0304* (2013.01); *G01S 3/7803* (2013.01); *G01S 3/784* (2013.01); *G06F 3/0346* (2013.01)

(58) Field of Classification Search
USPC .................................. 348/169, E5.024; 463/1
See application file for complete search history.

(56) References Cited

U.S. PATENT DOCUMENTS

| | | |
|---|---|---|
| 4,787,051 A | 11/1988 | Olson |
| 4,843,568 A | 6/1989 | Krueger |
| 5,128,671 A | 7/1992 | Thomas, Jr. |
| 5,259,037 A * | 11/1993 | Plunk ............................ 382/154 |
| 5,297,061 A | 3/1994 | Dementhon et al. |
| 5,454,043 A | 9/1995 | Freeman |
| 5,528,265 A | 6/1996 | Harrison |
| 5,616,078 A | 4/1997 | Oh |

(Continued)

FOREIGN PATENT DOCUMENTS

| | | |
|---|---|---|
| EP | 0 587 138 A2 | 3/1994 |
| EP | 2359223 | 8/2011 |

(Continued)

OTHER PUBLICATIONS

Wiki1. Wikipedia article on "Kalman Filter"(Published: Jan. 6, 2008). http://web.archive.org/web/20080106171355/http://en.wikipedia.org/wiki/Kalman_filter#Extended_Kalman_filter.*

(Continued)

*Primary Examiner* — Christopher S Kelley
*Assistant Examiner* — Ana Picon-Feliciano
(74) *Attorney, Agent, or Firm* — Blakely Sokoloff Taylor Zafman, LLP

(57) ABSTRACT

To calibrate a tracking system, a computing device receives positional data of a tracked object from an optical sensor as the object is pointed approximately toward the optical sensor. The computing device computes a first angle of the object with respect to an optical axis of the optical sensor using the received positional data. The computing device receives inertial data corresponding to the object, wherein a second angle of the object with respect to a plane normal to gravity can be computed from the inertial data. The computing device determines a pitch of the optical sensor using the first angle and the second angle.

18 Claims, 10 Drawing Sheets

(56) References Cited

U.S. PATENT DOCUMENTS

| | | | |
|---|---|---|---|
| 5,850,469 A * | 12/1998 | Martin et al. | 382/154 |
| 5,912,700 A | 6/1999 | Honey et al. | |
| 6,157,368 A | 12/2000 | Faeger | |
| 6,375,572 B1 | 4/2002 | Masuyama | |
| 6,509,973 B2 * | 1/2003 | Kiyoi et al. | 356/606 |
| 7,002,551 B2 * | 2/2006 | Azuma et al. | 345/158 |
| 7,071,970 B2 * | 7/2006 | Benton | 348/208.14 |
| 7,158,118 B2 | 1/2007 | Liberty | |
| 7,239,301 B2 | 7/2007 | Liberty et al. | |
| 7,262,760 B2 | 8/2007 | Liberty | |
| 7,414,611 B2 | 8/2008 | Liberty | |
| 7,421,369 B2 | 9/2008 | Clarkson | |
| 7,451,633 B2 * | 11/2008 | Bang et al. | 73/1.38 |
| 7,489,298 B2 | 2/2009 | Liberty et al. | |
| 7,489,299 B2 | 2/2009 | Liberty et al. | |
| 7,688,381 B2 * | 3/2010 | VanBree | 348/373 |
| 7,728,868 B2 * | 6/2010 | Razzaque et al. | 348/77 |
| 2002/0036779 A1 | 3/2002 | Kiyoi et al. | |
| 2002/0085097 A1 | 7/2002 | Colmenarez et al. | |
| 2002/0131052 A1 | 9/2002 | Emery et al. | |
| 2002/0131056 A1 | 9/2002 | Fujii et al. | |
| 2002/0181802 A1 | 12/2002 | Peterson | |
| 2002/0194914 A1 | 12/2002 | Foxlin et al. | |
| 2003/0158699 A1 | 8/2003 | Townsend et al. | |
| 2003/0233870 A1 | 12/2003 | Mancevski | |
| 2004/0212589 A1 | 10/2004 | Hall et al. | |
| 2004/0233461 A1 | 11/2004 | Armstrong et al. | |
| 2005/0088419 A1 | 4/2005 | Lapstun et al. | |
| 2005/0261073 A1 | 11/2005 | Farrington et al. | |
| 2006/0036947 A1 | 2/2006 | Jelley et al. | |
| 2006/0047427 A1 | 3/2006 | Weed et al. | |
| 2006/0252475 A1 * | 11/2006 | Zalewski et al. | 463/1 |
| 2006/0274032 A1 | 12/2006 | Mao et al. | |
| 2006/0284979 A1 | 12/2006 | Clarkson | |
| 2006/0287084 A1 | 12/2006 | Mao et al. | |
| 2007/0081695 A1 | 4/2007 | Foxlin et al. | |
| 2007/0211050 A1 | 9/2007 | Ohta | |
| 2008/0009348 A1 | 1/2008 | Zalewski et al. | |
| 2008/0061949 A1 | 3/2008 | Ferguson et al. | |
| 2008/0080789 A1 | 4/2008 | Marks et al. | |
| 2008/0143675 A1 | 6/2008 | Hsieh et al. | |
| 2008/0219509 A1 | 9/2008 | White et al. | |
| 2009/0009471 A1 | 1/2009 | Yamamoto et al. | |
| 2011/0163950 A1 | 7/2011 | Ye et al. | |

FOREIGN PATENT DOCUMENTS

| | | |
|---|---|---|
| EP | 2359606 | 8/2011 |
| GB | 2 345 538 A | 7/2000 |
| GB | 2 388 418 A | 11/2003 |
| JP | 2006126148 | 5/2006 |
| KR | 100643304 | 11/2006 |
| KR | 102007003206 | 3/2007 |
| WO | WO-0180736 | 11/2001 |
| WO | WO 02/27453 A2 | 4/2002 |
| WO | WO 2008/056180 | 5/2008 |

OTHER PUBLICATIONS

Wiki2. Wikipedia Article on "Angle of View" (Published on Nov. 9, 2007). http://web.archive.org/web/20071109225417/http://en.wikipedia.org/wiki/Angle_of_view.*

PCT International Search Report and Written Opinion for International Application No. PCT/US10/36697, mailed Aug. 17, 2010, 8 pages.

Bolt, R.A., "Put-that-there": voice and gesture at the graphics interface, Computer Graphics, vol. 14, No. 3 (ACM SIGGRAPH Conference Proceedings) Jul. 1980, pp. 262 270.

DeWitt, Thomas and Edelstein, Phil, "Pantomation: A System for Position Tracking," Proceedings of the 2nd Symposium on Small Computers in the Arts, Oct. 1982, pp. 61-69.

Dietrich, Frank, "Real Time Animation Techniques with Microcomputers" 1982, pp. 71-74.

PCT International Search Report and Written Opinion for International Application No. PCT/US09/55779, mailed Oct. 19, 2009, 11 pages.

PCT International Search Report and Written Opinion for International Application No. PCT/US09/50312, mailed Nov. 10, 2009, 8 pages.

Ziegler, Chris, http://www.engadget.com/2011/03/01/tobii-and-lenovo-show-off-prototype-eye-controlled-laptop-we-go/#disgus_thread, "Tobii and Lenovo show off prototype eye-controlled laptop, we go eyes-on" by Chris Ziegler posted on Mar. 1, 2011, 4 pages.

International Preliminary Report on Patentability and Written Opinion for International Patent Application No. PCT/US2009/050312, Mailed Jun. 30, 2011, 6 pages.

International Preliminary Report on Patentability and Written Opinion for International Patent Application No. PCT/US2009/055779, Mailed Jun. 30, 2011, 9 pages.

Non-Final Office Action for U.S. Appl. No. 12/435,285, Mailed Sep. 27, 2011, 21 pages.

International Preliminary Report on Patentability for International Patent Application No. PCT/US2010/036697, Mailed Dec. 15, 2011, 6 pages.

Non-Final Office Action for U.S. Appl. No. 12/435,386, Mailed Sep. 7, 2012.

Notice of Allowance for U.S. Appl. No. 12/435,285, Mailed Apr. 11, 2012, 7 pages.

European Supplemental Search Report for European Patent Application No. 09833784.3, Mailed Sep. 27, 2012.

Extended European Search Report for European Patent Application No. 10783873.2, Mailed Dec. 5, 2012.

International Search Report and Written Opinion for International Patent Application No. PCT/US2009/050312, Mailed Oct. 23, 2012, 14 pages.

Notice of Preliminary Rejection for Korean Patent Application No. 10-2011-7016665, Mailed Jan. 30, 2013.

Non-Final Office Action for Japanese Patent Application No. 2011-542152, Mailed Apr. 2, 2013.

Non-Final Office Action for Korean. Patent Application No. 10-2011-7016814, Mailed Feb. 28, 2013, 9 pages.

Extended European Search Report for European Patent Application No. 09833780.1, Mailed Oct. 23, 2012.

Kim, Anthony et al., "Initial Calibration of an Inertial Measurement Unit Using an Optical Position Tracking System", Position Location and Navigation Symposium, 2004, Plans 2004 Monterey, CA, USA, Apr. 26-29, 2004, Piscataway, NJ, USA, IEEE, US, Apr. 26, 2004, pp. 96-101, XP010768741.

Neumann, Ulrich et al., "Augmented Reality Tracking in Natural Environments", Proceedings of International Symposium on Mixed Reality (ISMR). Merging Real and Virtual Worlds. Jan. 1, 1999. pp. 101-130. XP001118695.

You, Suya et al., "Hybrid Inertial and Vision Tracking for Augmented Reality Registration", Proceedings IEEE 1999 Virtual Reality. Houston, TX, Mar. 13-17, 1999; [Proceedings IEEE 1999 Virtual Reality. (VR)], New York, NY Mar. 13, 1999, pp. 206-267, XP000887668.

Non-Final Office Action for Chinese Patent Application No. 200980150534, Mailed Apr. 23, 2013, Whole Document.

Non-Final Office Action for Chinese Patent Application No. 200980150534, Mailed Apr. 23, 2013 Whole Document.

Final Office Action for U.S. Appl. No. 12/435,386, Mailed Jun. 14, 2013, Whole Document.

Non-Final Office Action for Japanese Patent Application No. 2012-514022, Mailed Jul. 16, 2013, Whole Document.

Non-Final Office Action for Japanese Patent Application No. 2011-542148 Mailed Aug. 27, 2013, Whole Document.

Non-Final Office Action for Chinese Patent Application No. 200980150692.5, Mailed Jul. 3, 2013, Whole Document.

Non-Final Office Action for Japanese Patent Application No. 2011-542148, Mailed Apr. 8, 2014, Whole Document.

Non-Final Office Action for Chinese Patent Application No. 200980150534.X, Mailed Feb. 27, 2014, Whole Document.

(56) References Cited

OTHER PUBLICATIONS

Final Office Action for Japanese Patent Application No. 2011-542148, Mailed Dec. 19, 2013, Whole Document.
Non-Final Office Action for Korean Patent Application No. 2011-7016814, Mailed Mar. 31, 2014, Whole Document.
Final Office Action for Japanese Patent Application No. 2011-542148, Mailed Aug. 5, 2014, Whole Document.
Non-Final Office Action for Korean Patent Application No. 2011-7016665, Mailed Dec. 31, 2013, Whole Document.
Notice of Allowance for Chinese Patent Application No. 200980150692.5, mailed Nov. 3, 2014, Whole Document.

* cited by examiner

TRACKING SYSTEM CALIBRATION USING OBJECT POSITION AND ORIENTATION

RELATED APPLICATIONS

This patent application claims the benefit under 35 U.S.C. §119(e) of U.S. Provisional Application No. 61/182,702, filed May 30, 2009, which is herein incorporated by reference. This application is related to co-pending U.S. patent application Ser. No. 12/435,386, entitled, "Tracking System Calibration With Minimal User Input", filed on May 4, 2009 and co-pending U.S. patent application Ser. No. 12/435,285, entitled, "Correcting Angle Error In A Tracking System," filed on May 4, 2009.

FIELD OF THE INVENTION

The present invention relates generally to calibrating a tracking system, and more particularly to calibrating a tracking system that is used to track the location of an object based on positional data of the object and additional received or known data pertaining to the object.

DESCRIPTION OF THE RELATED ART

A growing trend in the computer gaming industry is to develop games that increase the interaction between a user and a gaming system. One way of accomplishing a richer interactive experience is to use game controllers whose movement is tracked by the gaming system in order to track the player's movements and use these movements as inputs for the game. Generally speaking, gesture input refers to having an electronic device such as a computing system, video game console, smart appliance, etc., react to some gesture captured by a video camera or other optical sensor that tracks an object.

In order to produce reliable measurements of the location and motion of the user, the gaming system needs to be calibrated. Such calibration is commonly necessary each time the gaming system is used. In conventional systems, calibrating the gaming system requires a controlled, precise process in which a user measures properties such as the tilt of the video camera, the distance from the user to the video camera, etc. Conventional gaming systems are not able to perform calibration without such a controlled and precise process.

BRIEF DESCRIPTION OF THE DRAWINGS

The invention may best be understood by reference to the following description taken in conjunction with the accompanying drawings in which.

DETAILED DESCRIPTION

Figure 1:
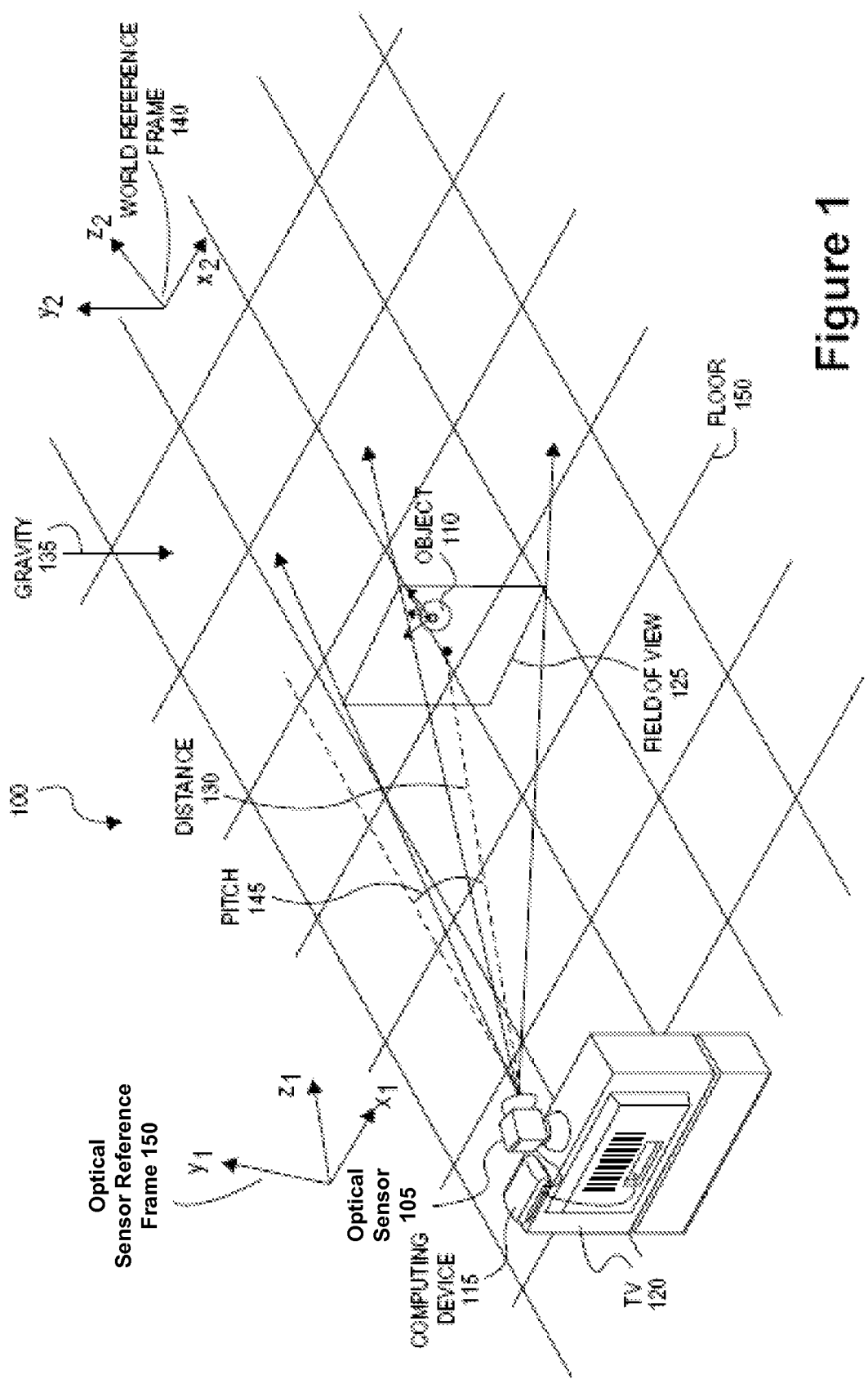
FIG. 1 illustrates a perspective view of a tracking system, in accordance with one embodiment of the present invention.

Described herein is a method and apparatus for calibrating a tracking system for use in a gaming system. In one embodiment, a user can calibrate the tracking system simply by pointing an object (e.g., a game controller) at an optical sensor of the tracking system, and pressing a button. In one embodiment, to calibrate the tracking system, positional data (e.g., image locations and image sizes) of a tracked object are received by an optical sensor as the object is pointed approximately toward the optical sensor. The optical sensor sends the positional data to a computing device (e.g., to a video game console). The computing device computes a first angle of the object with respect to an optical axis of the optical sensor using the received positional data. The computing device receives inertial data corresponding to the object, wherein a second angle of the object with respect to a plane normal to gravity can be computed from the inertial data. The computing device determines a pitch of the optical sensor using the first angle and the second angle. In one embodiment, the computing device also determines a relative yaw between the optical sensor and the tracked object.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "converting", "reconciling", "determining" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage devices.

The present invention also relates to an apparatus for performing the operations herein. This apparatus may be specially constructed for the required purposes, or it may comprise a general purpose computer selectively activated or reconfigured by a computer program stored in the computer. In one embodiment, the apparatus for performing the operations herein includes a game console (e.g., a Sony Playstation®, a Nintendo Wii®, a Microsoft Xbox®, etc.). A computer program may be stored in a computer readable storage medium, such as, but not limited to, any type of disk including floppy disks, optical disks (e.g., compact disc read only memory (CD-ROMs), digital video discs (DVDs), Blu-Ray Discs™, etc.), and magnetic-optical disks, read-only memories (ROMs), random access memories (RAMs), EPROMs, EEPROMs, magnetic or optical cards, or any type of media suitable for storing electronic instructions.

A machine-readable medium includes any mechanism for storing information in a form readable by a machine (e.g., a computer). For example, a machine-readable medium includes a machine readable storage medium such as read only memory ("ROM"), random access memory ("RAM"), magnetic disk storage media, optical storage media, and flash memory devices.

FIG. 1 illustrates a perspective view of a tracking system 100, in accordance with one embodiment of the present invention. The tracking system 100 includes an optical sensor 105, an object 110 that is tracked by the optical sensor 105, and a computing device 115 that processes data received by the optical sensor 105 and by the object 110. In one embodiment, the tracking system 100 is a component of a gaming system. Alternatively, the tracking system 100 may be a component of a motion capture system.

The optical sensor 105 is a sensor that measures positions of the object 110 in two-dimensional or three-dimensional space relative to the optical sensor 105. Positional data (e.g., images) taken by the optical sensor 105 are in a reference frame 150 of the optical sensor 105 that can be defined by an image plane and a vector normal to the image plane. A reference frame is defined herein as a coordinate system within which to measure an object's position, orientation and/or other properties. The terms reference frame and coordinate system are used interchangeably throughout this application.

As shown, the optical sensor 105 is positioned on top of a television set 120, with a negative pitch 145 relative to a floor 150. The pitch 145 is an angle between a horizontal axis of the optical sensor's reference frame 150 that is in the image plane of the optical sensor 105 and a plane perpendicular to gravity 135. As long as the pitch 145 is a non-zero value, the optical sensor 105 has a reference frame 150 that is different from a world reference frame 140 (defined as a reference frame that has an axis (e.g., $y_2$) aligned with gravity 135).

In one embodiment, the optical sensor 105 is a standard video camera. In such an embodiment, the optical sensor 105 may capture depth information (distance 130 between the optical sensor 105 and the object 110) based on predefined information that identifies a size of the object 110 and/or based on predefined information that identifies a field of view (FOV) 125 of the optical sensor 105. The field of view 125 is the angular extent of a given scene imaged by the optical sensor 105. The field of view defines the distortion (e.g., amount of zoom) of an image caused by a camera lens. As the object 110 is moved further from the optical sensor 105 (that is, as the distance 130 is increased), an image of the object 110 as captured by the optical sensor 105 becomes smaller. Therefore, the distance 130 of the object 110 to the optical sensor 105 can be determined based on a ratio of the image size of the tracked object 110 (e.g., as measured in pixels) to a known actual size of the tracked object 110 provided that a field of view 125 of the optical sensor 105 is known.

In another embodiment, the optical sensor 105 is a Z-camera (a single lens video camera capable of capturing video with depth information) or a stereo camera (video camera with 2 or more lenses that can capture three-dimensional images). In such an embodiment, the optical sensor 105 can capture depth information without being pre-configured with information identifying a size of the object 110.

Figure 2:
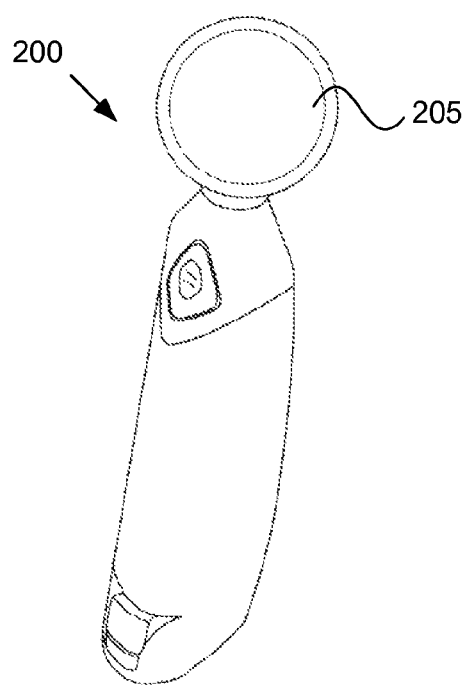
FIG. 2 illustrates a game controller having a ball section, in accordance with one embodiment of the present invention.
Figure 3:
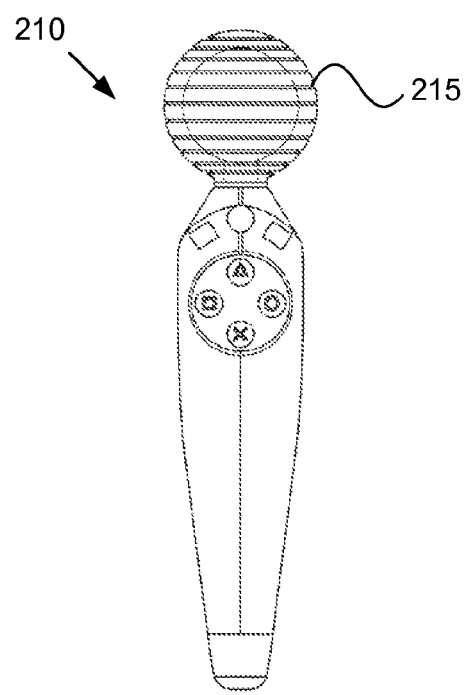
FIG. 3 illustrates another game controller having a ball section, in accordance with another embodiment of the present invention.

The object 110 is an electronic device that includes or is connected with one or more inertial sensors. The inertial sensors may measure accelerations along a single axis or multiple axes, and may measure linear as well as angular accelerations. In one embodiment, the object 110 is a hand held electronic device or a portion of a handheld electronic device such as a game controller, as shown in FIGS. 2 and 3. The object 110 may have an arbitrary shape, such as a square, sphere, triangle, or more complicated shape. In one embodiment, the object 110 has a spherical shape.

FIG. 2 illustrates a game controller 200 having a ball section 205, in accordance with one embodiment of the present invention. FIG. 3 illustrates another game controller 210 having a ball section 215, in accordance with another embodiment of the present invention. In certain embodiments, the ball sections 205 and 215 correspond to object 110 of FIG. 1.

The ball sections 205, 215 can be of different colors, and in one embodiment, the ball sections 205, 215 can light up. Although a spherical ball section is illustrated, the ball sections 205, 215 can have other shapes for visual tracking purposes, such as a partial sphere, an imperfect sphere, an elongated ball (like one used in American football or in rugby), a cube-like shape, etc. In one embodiment, the ball section 205, 215 is 4 cm. in diameter. However, other larger or smaller sizes are also possible. Larger sizes help with visual recognition. For example, a ball with a 5 cm. diameter can provide about 55 percent more pixels for image recognition than a 4 cm. ball.

Returning to FIG. 1, object 110 and optical sensor 105 are connected with computing device 115 through wired and/or wireless connections. Examples of wired connections include connections made via an IEEE 1394 (firewire) cable, an ethernet cable, and a universal serial bus (USB) cable, etc. Examples of wireless connections include wireless fidelity (WiFi™) connections, Bluetooth® connections, Zigbee® connections, and so on. In the illustrated embodiment, object 110 is wirelessly connected with computing device 115 and optical sensor 105 is connected with computing device 115 via a wired connection.

Computing device 115 may be a video game console, a personal computer, a game kiosk, or other computing apparatus. Computing device 115 may execute games or other applications that can respond to user input from object 110. The object 110 is tracked, and motion of the object 110 provides the user input.

Before the tracking system 100 can accurately track the object 110, the tracking system 100 needs to be calibrated. Calibrating the tracking system 100 may include computing a pitch 145 of the optical sensor 105 and computing a relative yaw between the optical sensor 105 and the object 110. The relative yaw between the object 110 and the optical sensor 105 represents the differences in heading between the object 110 and the optical sensor 105 and is represented as a rotation about the Y-axis (axis aligned with gravity) in the world reference frame. In one embodiment, zero yaw is defined as being achieved between the optical sensor 105 and the object 110 when the object is pointed perpendicular to an imaging plane of the optical sensor 105. Alternatively, zero yaw may be defined as being achieved when the object 110 is pointed directly toward the optical sensor 105. If the optical sensor 105 is a camera with an unknown field of view 125, calibrating the tracking system 100 also includes computing the field of view 125 of the optical sensor 105. If the object 110 has an unknown size, calibrating the tracking system 100 may also include determining the size of the object 110. Techniques for calibrating the pitch and the yaw are discussed in greater detail below with reference to FIGS. 4A-4C and 6-7.

Figure 4A:
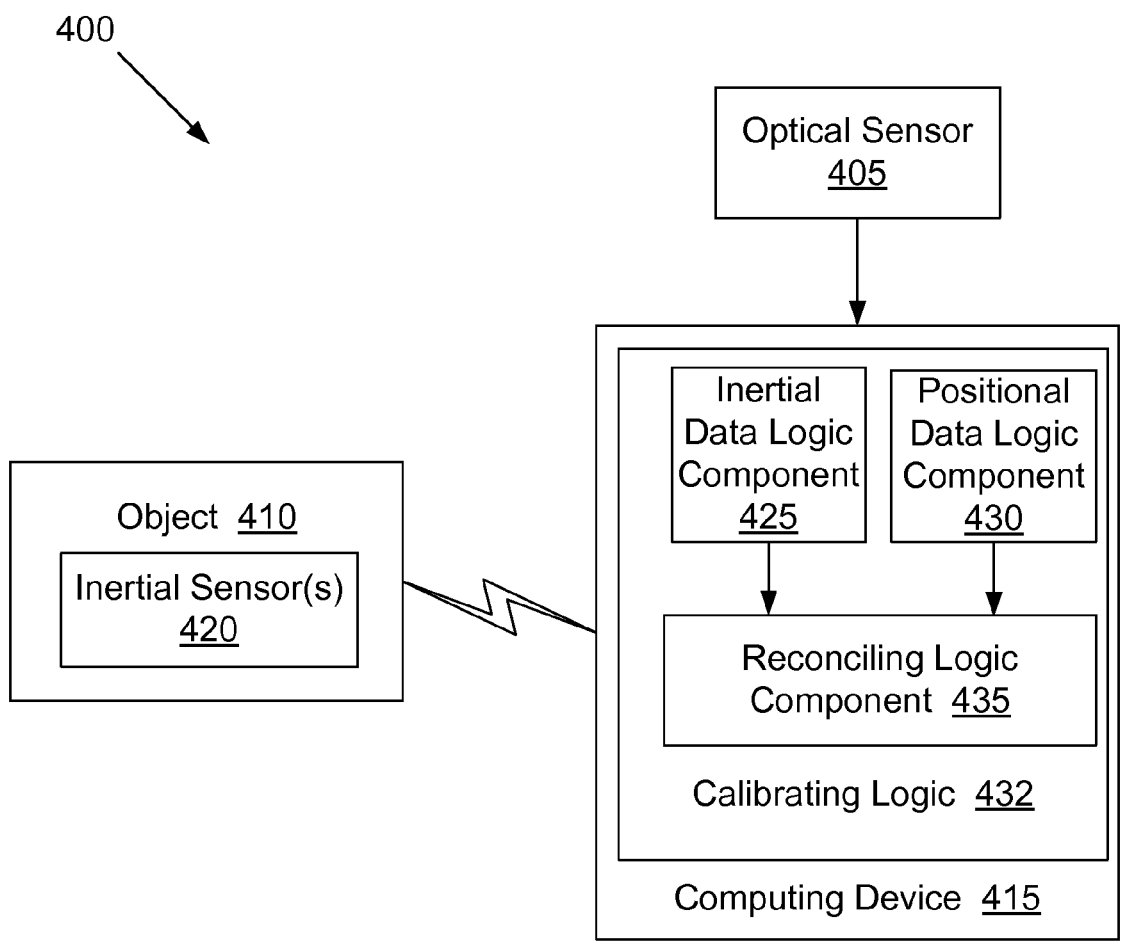
FIG. 4A illustrates a block diagram of a tracking system, in accordance with one embodiment of the present invention.

FIG. 4A illustrates a block diagram of a tracking system 400, in accordance with one embodiment of the present invention. The tracking system 400 includes a computing device 415 physically connected with an optical sensor 405 and wirelessly connected with an object 410 that is tracked by the optical sensor 405. It should be noted that the computing device 415 may be wirelessly connected with the optical sensor 405 and/or physically connected with the object 410. In one embodiment, the tracking system 400 corresponds to tracking system 100 of FIG. 1.

The object 410 includes one or more inertial sensors 420 that have a fixed position in the object 410. In one embodiment, the inertial sensors 420 include one or more gyroscopes and one or more accelerometers. Gyroscopes use principals of angular momentum to detect changes in orientation (e.g., changes in pitch, roll and twist). Accelerometers measure accelerations along one or more axes. The gyroscope and accelerometer may be separate sensors, or may be combined into a single sensor. In one embodiment, the gyroscope and accelerometer are micro-electromechanical systems (MEMS) devices. Inertial sensors 420 gather motion data, and transmit the motion data to inertial data logic component 425. In one embodiment, the motion data is transmitted to inertial data logic component 425 continuously as the data is obtained.

The optical sensor 405 may be a video camera, a Z-camera, a stereo camera, or other device capable of capturing an image. As the object 410 is moved and/or held steady, the optical sensor 405 captures positional data (e.g., images) of the object 410 that may include image size and image location information. The optical sensor 405 then transmits the positional data to the computing device 415. In one embodiment, the optical sensor 405 streams the positional data to computing device 415 in real time as the positional data is obtained.

The computing device 415 may be a video game console, personal computer, game kiosk, etc. In one embodiment, the computing device 415 includes a calibrating logic 432 that calibrates the tracking system 400 based on the positional data obtained from the optical sensor 405 and the inertial data obtained from the object 410. In a further embodiment, the calibrating logic 432 includes an inertial data logic component 425, a positional data logic component 430 and a reconciling logic component 435, each of which performs different operations related to calibration.

Inertial data logic component 425 analyzes inertial data received from object 410. In one embodiment, inertial data logic component 425 processes the inertial data to compute a pitch of the object 410. The pitch of the object 410 is an angle φ between the object and a plane normal to gravity. Gravity asserts a constant downward force that can be measured by the inertial sensor 420. Accordingly, the acceleration measured when the object 410 is at rest is due to gravity. Based on the downward force of gravity detected by the inertial sensor 420, the angle φ can be determined between the object 410 and a plane normal to gravity (e.g., the ground) regardless of the orientation of the object 410. Thus, the inertial data logic component 425 can determine the orientation of the object in the world reference frame. Inertial data logic component 425 transmits the object pitch to reconciling logic 435.

Positional data logic component 430 analyzes positional data (e.g., images) received from the optical sensor 405, (e.g., to find the object 410 in the images). In one embodiment, an image location of the object 410 is determined by analyzing a pixel group that represents the object 410 in the image to find the object's centroid. In one embodiment, a Gaussian distribution of each pixel can be calculated and used to provide sub-pixel accuracy of the centroid location.

The positional data logic component 430 determines an image angle of a ray that extends from the object 410 to the center of the optical sensor 405 based on the position of the object 410 in the image. The positional data logic component 430 then communicates the image angle to reconciling logic 435. In one embodiment, the image angle is a 3D angle. Alternatively, one or two 3D image angles may be computed and communicated to the reconciling logic 435. The image angle gives the orientation of the object in the reference frame of the optical sensor.

Figure 4B:
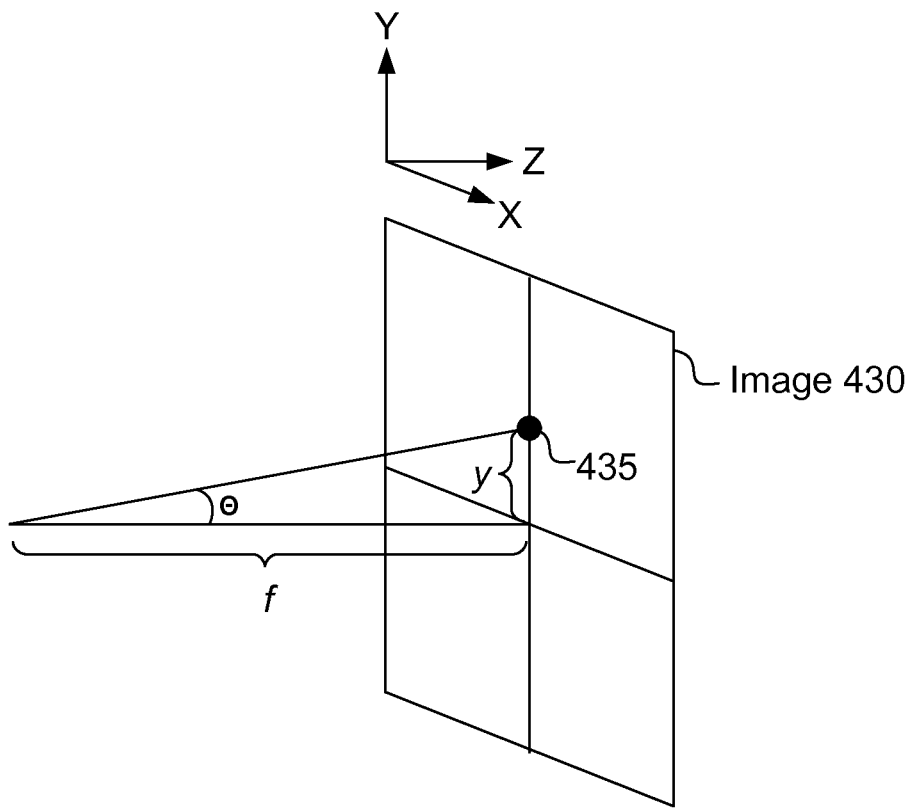
FIG. 4B illustrates the relationship between the location of an object in an image and an image angle in the Y-Z plane for that object.

FIG. 4B illustrates the relationship between the location of an object 435 in an image 430 and an image angle θ in the Y-Z plane for that object 435. The image 430 is an image taken by an optical sensor having a focal length f. The focal length f is a value proportional to the field of view of the camera. In one embodiment, the focal length f is measured in pixels. The illustrated image angle is a 2D image angle in the Y-Z plane, which can be computed according to the equation:

$$\theta = \arctan\left(\frac{y}{f}\right) \quad \text{(equation 1)}$$

where y is the vertical offset from the center of the image in pixels and f is the focal length of the optical sensor in pixels. In one embodiment, if the object is above the center of the image, then the image angle is positive. If the object is below the center of the image, and the image angle is negative.

Note that in the illustrated image 430, the object is on the Y axis, which may occur if the object is directly in front of the optical sensor. So long as the object is on the Y axis, the 3D image angle and 2D image angle computations are the same. However, if the object 435 were not on the Y-axis, then a 3D image angle would also have a component in the X-Z plane. In one embodiment, a separate 2D image angle φ in the X-Z plane is also computed. In another embodiment, a 3D image angle in XYZ is computed. This 3D image angle may later be decomposed into separate 2D angles. In one embodiment, to compute the image angle θ, any X positional data is assumed to be zero. This provides a mathematical simplification that may not impact accuracy for the determination of a pitch of the optical sensor. Alternatively, the image angle θ may be computed by determining a 3D image angle and projecting that 3D image angle onto the Y-Z plane, e.g., by taking the cosine of the 3D angle.

Returning to FIG. 4A, reconciling logic component 435 combines the image angle with the object pitch to determine the pitch of the optical sensor 405 and/or the relative yaw between the object 410 and the optical sensor. When the pitch and yaw are to be calibrated, a user is directed to point the object 410 approximately at the optical sensor 405. When the object 410 is pointed at the optical sensor, the orientation of the object 410 corresponds to the image angle of the object as measured by the positional data logic component 430. This provides a common reference point that can be used to combine the angle/pitch of the object 410 with respect to the ground and the measured image angle. The computing device 415 determines the orientation of the object in the world reference frame (object pitch), and the orientation of the object in the reference frame of the optical sensor (image angle), and combines these to find the orientation of the optical sensor in the world reference frame. In one embodiment, accurate calibration can be performed even if the user does not point the object directly at the optical sensor. In one embodiment, an accuracy of the calibration increases the further the object is from the optical sensor.

Figure 4C:
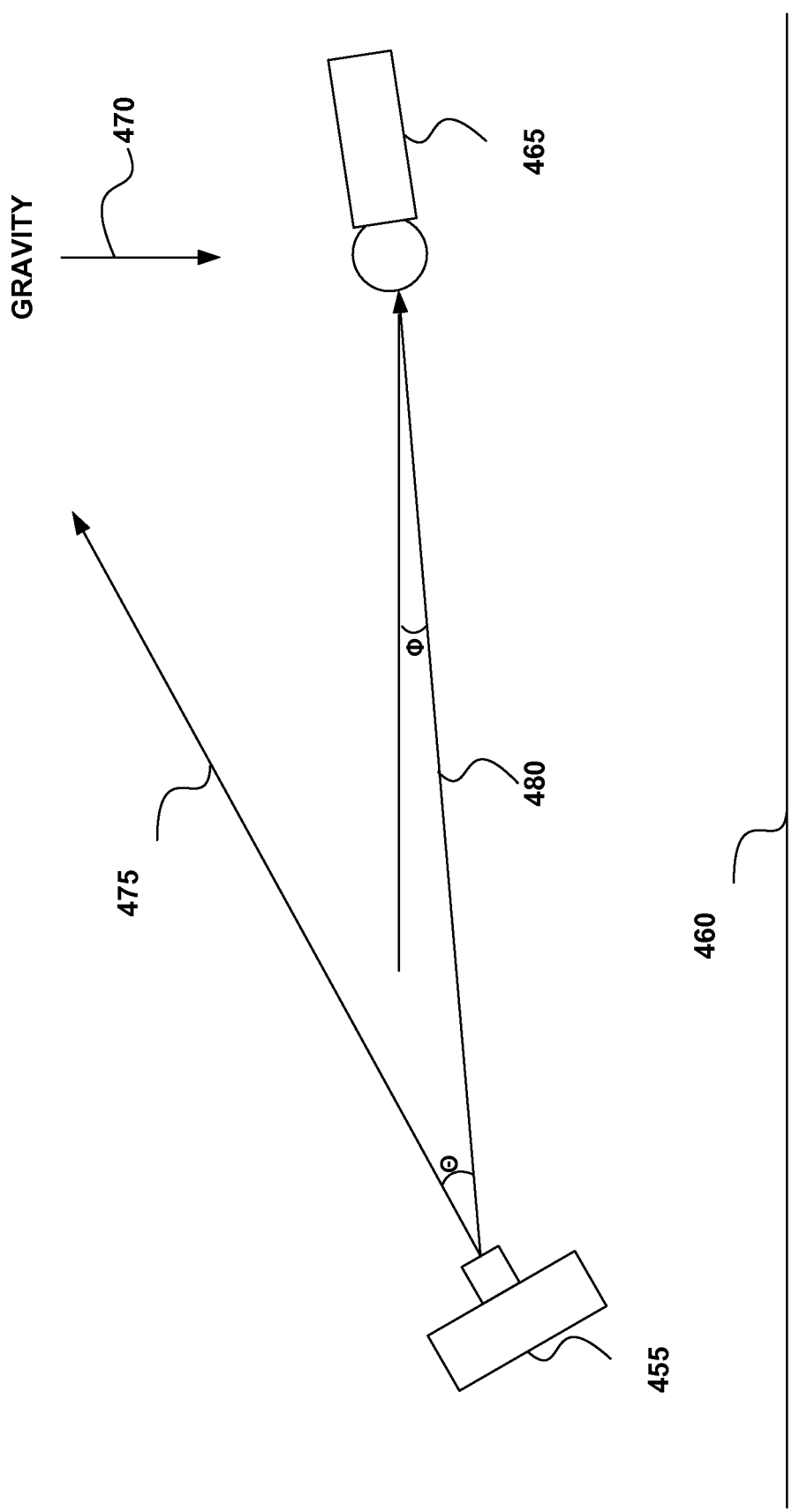
FIG. 4C illustrates relative positions and orientations of components of a tracking system during calibration.

FIG. 4C illustrates relative positions and orientations of components of the tracking system during calibration. In FIG. 4C, an optical sensor 455 has an unknown pitch relative to the floor 460. An object 465 is pointed toward the optical sensor 455. Using data from inertial sensors, an angle $\phi$ can be determined between the object 465 and the floor 460.

Since the object 465 is pointed at the optical sensor 455, a position and orientation of the object 465 corresponds to an image angle $\theta$ measured in a frame of reference of the optical sensor 455. The image angle $\theta$ and object pitch $\phi$ can be combined to find a pitch of the optical sensor, $\alpha$, according to the following equation:

$$\alpha = \theta + \phi \quad \text{(equation 2)}$$

where the pitch, $\alpha$, is the angle between the optical sensor and the plane perpendicular to gravity.

Returning to FIG. 4A, in one embodiment, the reconciling logic component 435 also determines the relative yaw between the object 410 and the optical sensor 405. In one embodiment, the relative yaw between the object 410 and the optical sensor 405 is computed after computing the pitch of the optical sensor 405. In one embodiment, the relative yaw between the object 410 and the optical sensor 405 is zero in the world frame of reference, so long as the object 410 is pointed at the optical sensor 405 during calibration.

The relative yaw can be determined in the reference frame of the optical sensor 405 using the computed pitch of the optical sensor 405 and the measured image angle between the optical axis and a ray extending from the center of the optical sensor to the center of the object in the X-Z plane. In one embodiment, the relative yaw is computed after computing the pitch of the optical sensor 405 by transforming a vector representing a ray extending from the optical center of the optical sensor 405 to a center of the object 410 from the optical sensor's reference frame into the world reference frame. The transformation may be a rotation about the x-axis by the computed pitch angle, $\alpha$. Using matrix notation, this would be:

$$V_W = R_x(\alpha) \cdot V_C = \begin{bmatrix} \cos\alpha & -\sin\alpha \\ \sin\alpha & \cos\alpha \end{bmatrix} \cdot V_C \quad \text{(equation 3)}$$

where the vector $V_W$ is the vector representing a ray extending from the optical center of the optical sensor 405 to a center of the object 410 in the world coordinate system, and $V_C$ is that vector in the optical sensor's coordinate system. After the vector is converted into world coordinates, the relative yaw angle can be computed as set forth below.

Finding the relative yaw and the pitch of the optical sensor is performed by the reconciling logic component 435 in one embodiment by computing a three dimensional rotation that aligns the world coordinate system with the coordinate system of the optical sensor 405. A three dimensional rotation can be defined by an axis and an angle. The rotation axis ê for the three dimensional rotation can be solved for by taking the cross product of vectors, as follows:

$$\hat{e} = V_1 \times V_2 \quad \text{(equation 4)}$$

where vector $V_1$ represents the orientation of the object 410 in the world reference frame, and the vector $V_2$ represents the orientation of the object 410 in the reference frame of the optical sensor 405. As discussed above, the vector $V_1$ can be determined based on the measured pitch of the object 410 relative to gravity and the vector $V_2$ can be determined based on the 3D image angle of the object 410 in an image taken by the optical sensor 405.

The dot product of $V_{i1}$ and $V_{i2}$ can also be taken to find a scalar s that represents the projection of $V_{i1}$ onto $V_{i2}$, as follows:

$$s = V_{i1} \cdot V_{i2} \quad \text{(equation 5)}$$

The angle of the three dimensional rotation $\gamma$ can then be solved for using the rotation axis and the scalar as follows:

$$\gamma = \arctan\frac{\hat{e}}{r} = \arctan\frac{\|V_{i1} \times V_{i2}\|}{V_{i1} \cdot V_{i2}} \quad \text{(equation 6)}$$

The three dimensional rotation may then be decomposed into either of the reference frames to determine the angles of rotation about each of the axes of that reference frame. For example, the three dimensional rotation can be projected onto the yz plane (plane that the x-axis is normal to) to determine the amount of rotation that is occurring about the x-axis, and can be projected onto the xz plane (plane that the y-axis is normal to) to determine the amount of rotation that is occurring about the y-axis. If the three dimensional angle is projected into the world reference frame, the rotation about the axis that is aligned with gravity is the yaw, and the rotation about the axis that is perpendicular to gravity and in the imaging plane of the optical sensor is the pitch. The three dimensional rotation can be decomposed into rotations about the axes of the reference frames using, for example, three orthogonal matrices, a rotation matrix or a quaternion.

Quaternions form a four dimensional normed division algebra over the real numbers. Quaternions provide a useful representation of coordinate transformations because they can be computed faster than matrix transformations, and never lose their orthogonality. A quaternion representation of a rotation is written as a four dimensional vector:

$$q = [q_1 q_2 q_3 q_4]^T \quad \text{(equation 7)}$$

In terms of the world reference frame, the quaternion's elements are expressed as follows:

$$q_1 = \frac{\hat{e}_x \sin\left(\frac{\theta}{2}\right)}{|V_{i1} \times V_{i2}|} \quad \text{(equation 8)}$$

$$q_2 = \frac{\hat{e}_y \sin\left(\frac{\theta}{2}\right)}{|V_{i1} \times V_{i2}|} \quad \text{(equation 9)}$$

$$q_3 = \frac{\hat{e}_z \sin\left(\frac{\theta}{2}\right)}{|V_{i1} \times V_{i2}|} \quad \text{(equation 10)}$$

$$q_4 = \cos\left(\frac{\theta}{2}\right) \quad \text{(equation 11)}$$

Where $\hat{e}_x$, $\hat{e}_y$, and $\hat{e}_z$ represent the unit vectors along the x, y and z axes of the world reference frame, respectively.

The quaternion fully represents both the yaw and pitch rotations that are necessary to align the reference frames. However, to provide a more intuitive result, the quaternion may be converted to Euler angles of pitch, yaw and roll. The roll, pitch and yaw can be computed from the quaternion according to the formulas:

$$\text{yaw} = \arctan\frac{2(q_4 q_2 + q_3 q_1)}{1 - 2(q_1^2 + q_2^2)} \quad \text{(equation 12)}$$

$$\text{pitch} = \arcsin(2(q_4 q_1 - q_2 q_3)) \quad \text{(equation 13)}$$

$$\text{roll} = \arctan\frac{2(q_4 q_3 + q_1 q_2)}{1 - 2(q_3^2 + q_1^2)} \quad \text{(equation 14)}$$

The yaw, pitch and roll angles may be determined for the vector pair.

Figure 5:
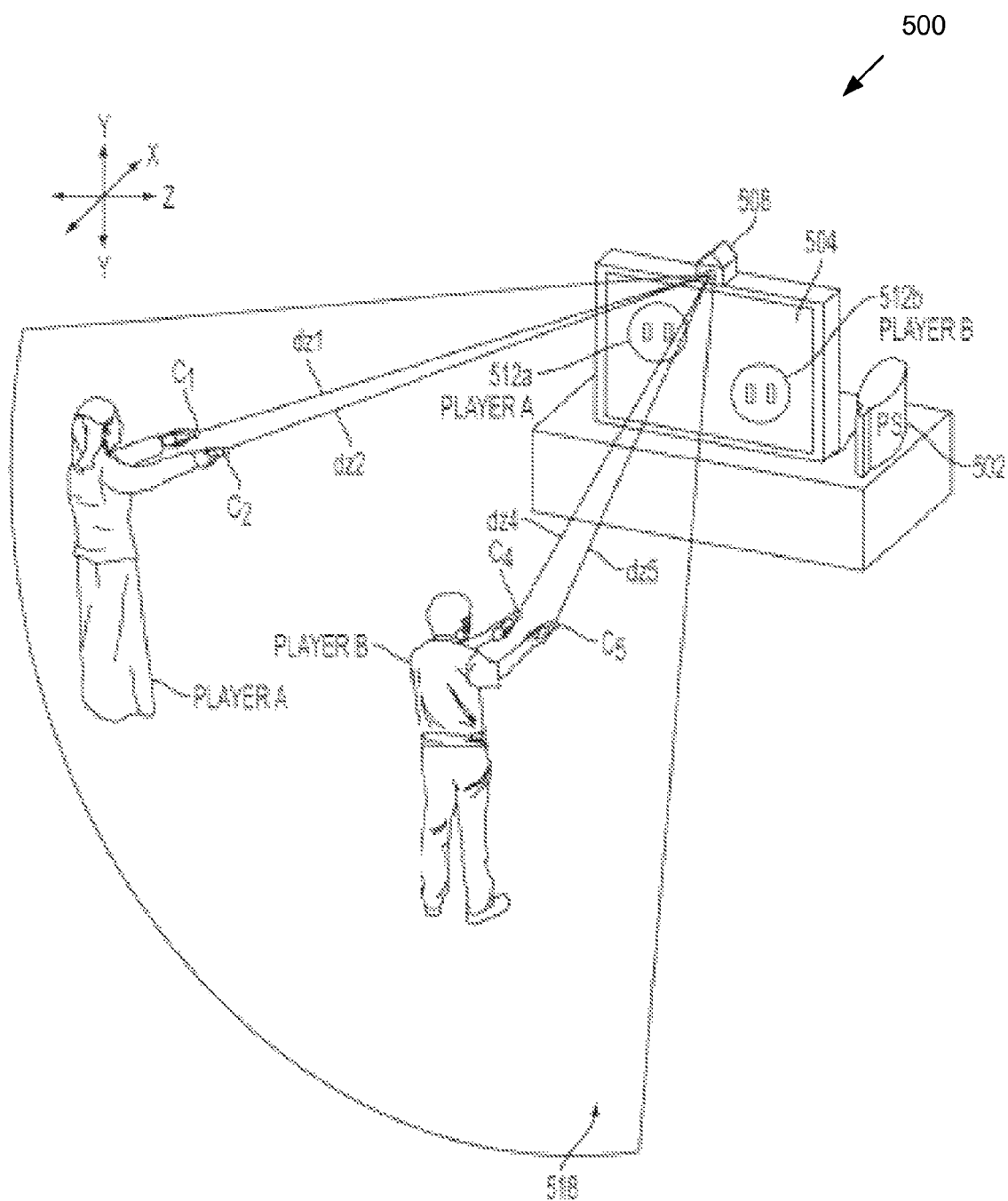
FIG. 5 shows a schematic diagram of a multiplayer environment, in which visual information is used to determine the locations of different controllers held by players, according to one embodiment.

FIG. 5 shows a schematic diagram of a multiplayer environment 500, in which visual information is used to determine the locations of different controllers held by players, according to one embodiment. In the multiplayer environment 500, optical sensor 508 obtains an image of a playing field 518, and the image is analyzed to obtain the location of ball-attached controllers $C_1$, $C_2$, $C_4$ and $C_5$. Distances $d_{z1}$, $d_{z2}$, $d_{z4}$, and $d_{z5}$ are estimated by analyzing the shape and size of the respective balls in the captured image. A computing device 502 uses the obtained coordinates and distances to produce representations of the players in screen 504, avatars 512a and 512b respectively. A typical distance for good image recognition is about 10 ft (3 mtr). One advantage of using visual recognition is that improvements in image capture and image recognition can be included in the system without having to change the controller.

Figure 6:
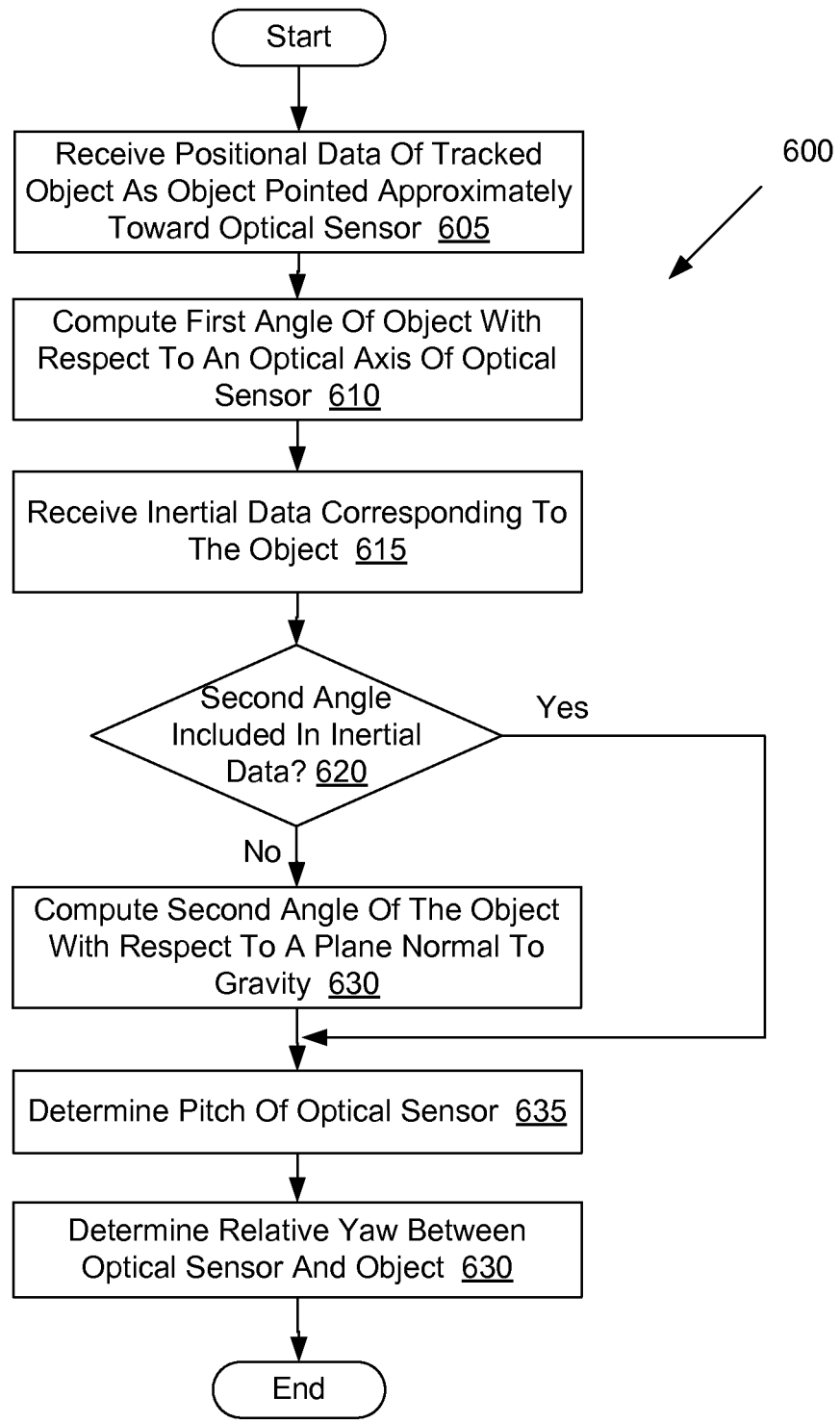
FIG. 6 illustrates a flow diagram of one embodiment for a method of calibrating a tracking system.

FIG. 6 illustrates a flow diagram of one embodiment for a method 600 of calibrating a tracking system. The method may be performed by processing logic that may comprise hardware (e.g., circuitry, dedicated logic, programmable logic, microcode, etc.), software (such as instructions run on a processing device), or a combination thereof. In one embodiment, method 600 is performed by computing device 115 of FIG. 1. In one embodiment, method 600 is performed each time a game or other application is started on computing device 115. Alternatively, method 600 may be performed each time movement of a tracked object is detected after a period of inactivity. Alternatively, method 600 may be performed upon receiving a calibration signal. The calibration signal may be generated when a user points an object at an optical sensor and presses a calibrate button.

Referring to FIG. 6, at block 605 the computing device receives positional data (e.g., image locations and image sizes) of a tracked object from a optical sensor as the object is pointed approximately toward the optical sensor. In one embodiment, the computing device receives images of the object in a two-dimensional reference frame of the optical sensor.

At block 610, the computing device computes a first angle of the object with respect to an optical axis of the optical sensor. In one embodiment, the computing device computes a 3D image angle. Alternatively, the computing device may compute a first 2D image angle along a YZ plane and a second image angle along an XZ plane of the optical sensor.

At block 615, the computing device receives inertial data from the tracked object as the tracked object is pointed approximately toward the optical sensor. The inertial data corresponds to the orientation of the object. In one embodiment, the inertial data is preprocessed before it is received, and already includes a second angle that represents the pitch of the object. Alternatively, raw inertial data may be received.

At block 620 the computing device determines whether the second angle is included in the inertial data, or if the second angle needs to be computed. If the second angle needs to be computed, the method proceeds to block 630, and the computing device computes the second angle with respect to a plane normal to gravity. Otherwise, the method proceeds to block 635.

At block 635, the computing device determines a pitch of the optical sensor by combining the first angle and the second angle. In one embodiment, in which the first angle and second angle are both 2D angles, the first angle and the second angle are added.

At block 630, a relative yaw between the optical sensor and the object 630 are computed. In one embodiment, the pitch of the optical sensor and the relative yaw are computed together. In another embodiment, the pitch is computed first, and the pitch results are used during computation of the relative yaw. Alternatively, the pitch and/or relative yaw may be computed iteratively, wherein an assumed pitch is used for the yaw calculation and an assumed yaw is used for the pitch calculation. With each iteration, the accuracy of the calibration may be increased. The method then ends.

Figure 7:
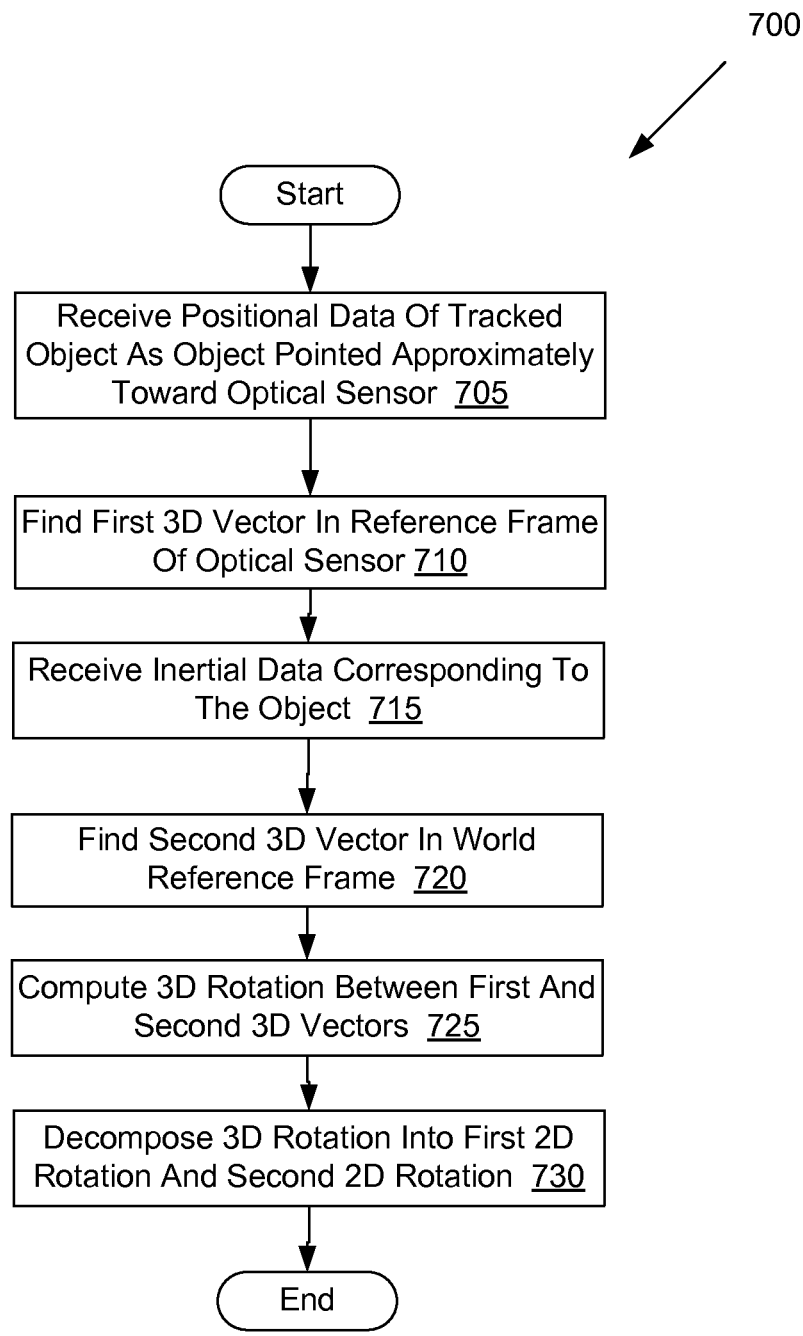
FIG. 7 illustrates a flow diagram of another embodiment for a method of calibrating a tracking system.

FIG. 7 illustrates a flow diagram of another embodiment for a method 700 of calibrating a tracking system. The method may be performed by processing logic that may comprise hardware (e.g., circuitry, dedicated logic, programmable logic, microcode, etc.), software (such as instructions run on a processing device), or a combination thereof. In one embodiment, method 700 is performed by computing device 115 of FIG. 1. In one embodiment, method 700 is performed each time a game or other application is started on computing device 115. Alternatively, method 700 may be performed each time movement of a tracked object is detected after a period of inactivity.

Referring to FIG. 7, at block 705 the computing device receives positional data (e.g., image locations and image sizes) of a tracked object from an optical sensor as the object is pointed toward the optical sensor. At block 710, the computing device finds a first 3D vector that extends from the center of the optical sensor to the object based on an image angle of the object in an image taken by the optical sensor. The first 3D vector is in the reference frame of the optical sensor.

At block 715, the computing device receives inertial data corresponding to the object. The data may be received from the object or from an inertial sensor connected with the object. At block 720, the computing device finds a second 3D vector in the world reference frame based on the inertial data.

At block 725, the computing device computes a 3D rotation between the first and second vectors. At block 730, the computing device decomposes the 3D rotation into a first 2D rotation and a second 2D rotation. The first 2D rotation may represent the pitch of the optical sensor, and the second 2D rotation may represent the relative yaw between the optical sensor and the object. The method then ends.

Figure 8:
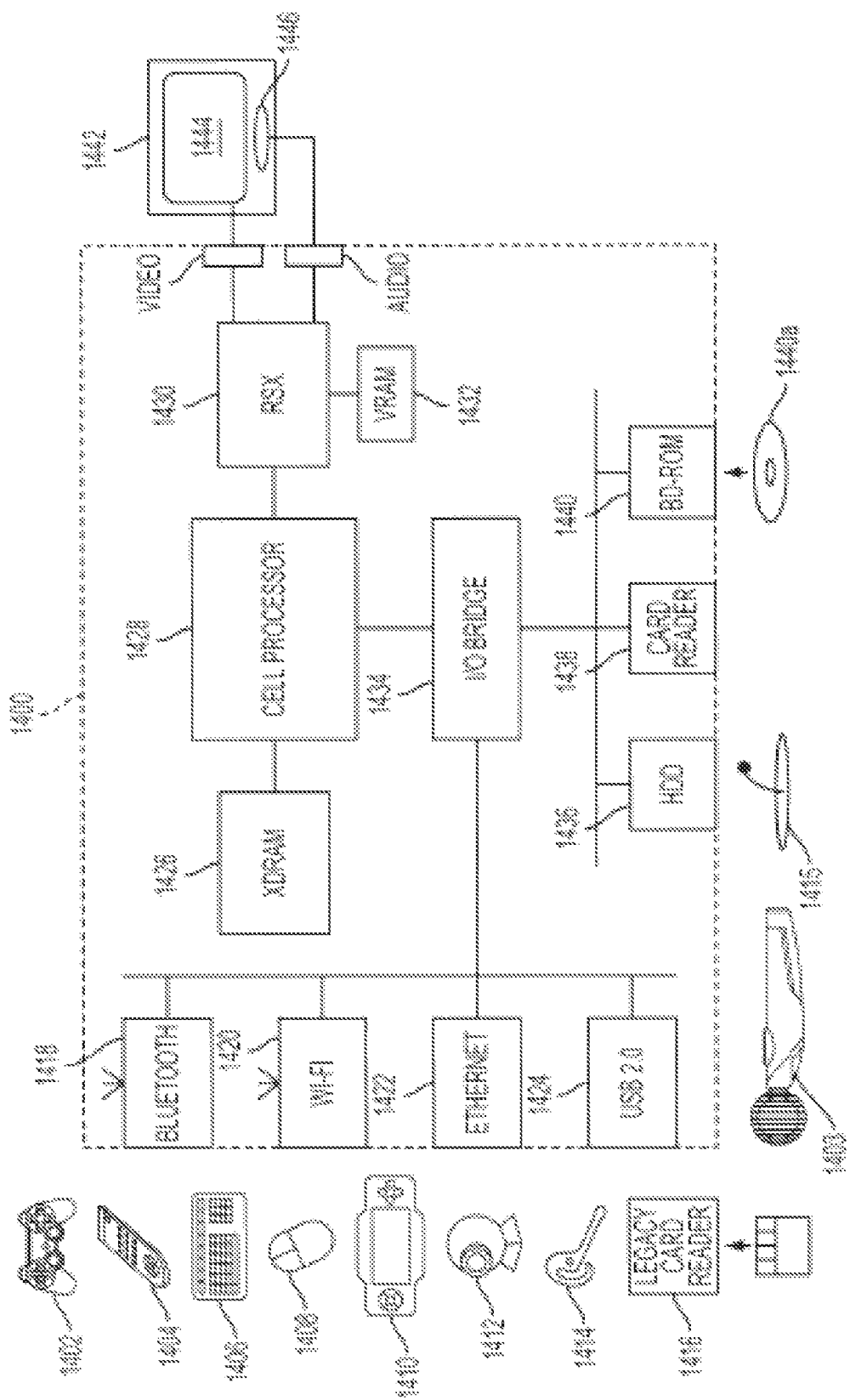
FIG. 8 illustrates hardware and user interfaces that may be used to determine controller location, in accordance with one embodiment of the present invention.

FIG. 8 illustrates hardware and user interfaces that may be used to determine controller location, in accordance with one embodiment of the present invention. FIG. 8 schematically illustrates the overall system architecture of the Sony® Playstation 3® entertainment device, a console that may be compatible for implementing a three-dimensional controller locating system in accordance with one embodiment of the present invention. A system unit 1400 is provided, with various peripheral devices connectable to the system unit 1400. The system unit 1400 comprises: a Cell processor 1428; a Rambus® dynamic random access memory (XDRAM) unit 1426; a Reality Synthesizer graphics unit 1430 with a dedicated video random access memory (VRAM) unit 1432; and an I/O bridge 1434. The system unit 1400 also comprises a Blu Ray® Disk BD-ROM® optical disk reader 1440 for reading from a disk 1440a and a removable slot-in hard disk drive (HDD) 1436, accessible through the I/O bridge 1434. Optionally the system unit 1400 also comprises a memory card reader 1438 for reading compact flash memory cards, Memory Stick® memory cards and the like, which is similarly accessible through the I/O bridge 1434.

The I/O bridge 1434 also connects to multiple Universal Serial Bus (USB) 2.0 ports 1424; a gigabit Ethernet port 1422; an IEEE 802.11b/g wireless network (Wi-Fi) port 1420; and a Bluetooth® wireless link port 1418 capable of supporting of up to seven Bluetooth connections.

In operation, the I/O bridge 1434 handles all wireless, USB and Ethernet data, including data from one or more game controllers 1402-1403. For example when a user is playing a game, the I/O bridge 1434 receives data from the game controller 1402-1403 via a Bluetooth link and directs it to the Cell processor 1428, which updates the current state of the game accordingly.

The wireless, USB and Ethernet ports also provide connectivity for other peripheral devices in addition to game controllers 1402-1403, such as: a remote control 1404; a keyboard 1406; a mouse 1408; a portable entertainment device 1410 such as a Sony Playstation Portable® entertainment device; a video camera such as an EyeToy® video camera 1412; a microphone headset 1414; and a microphone 1415. Such peripheral devices may therefore in principle be connected to the system unit 1400 wirelessly; for example the portable entertainment device 1410 may communicate via a Wi-Fi ad-hoc connection, whilst the microphone headset 1414 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 1416 may be connected to the system unit via a USB port 1424, enabling the reading of memory cards 1448 of the kind used by the Playstation® or Playstation 2® devices.

The game controllers 1402-1403 are operable to communicate wirelessly with the system unit 1400 via the Bluetooth link, or to be connected to a USB port, thereby also providing power by which to charge the battery of the game controllers 1402-1403. Game controllers 1402-1403 can also include memory, a processor, a memory card reader, permanent memory such as flash memory, light emitters such as LEDs or infrared lights, microphone and speaker for ultrasound communications, an acoustic chamber, a digital camera, an internal clock, a recognizable shape such as a spherical section facing the game console, and wireless communications using protocols such as Bluetooth®, WiFi™, etc.

Game controller 1402 is a controller designed to be used with two hands, and game controller 1403 is a single-hand controller with a ball attachment, as previously described in FIGS. 2-3. In addition to one or more analog joysticks and conventional control buttons, the game controller is susceptible to three-dimensional location determination. Consequently gestures and movements by the user of the game controller may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 1404 is also operable to communicate wirelessly with the system unit 1400 via a Bluetooth link. The remote control 1404 comprises controls suitable for the operation of the Blu Ray™ Disk BD-ROM reader 1440 and for the navigation of disk content.

The Blu Ray™ Disk BD-ROM reader 1440 is operable to read CD-ROMs compatible with the Playstation and PlayStation 2 devices, in addition to conventional pre-recorded and recordable CDs, and so-called Super Audio CDs. The reader 1440 is also operable to read DVD-ROMs compatible with the Playstation 2 and PlayStation 3 devices, in addition to conventional pre-recorded and recordable DVDs. The reader 1440 is further operable to read BD-ROMs compatible with the Playstation 3 device, as well as conventional pre-recorded and recordable Blu-Ray Disks.

The system unit 1400 is operable to supply audio and video, either generated or decoded by the Playstation 3 device via the Reality Synthesizer graphics unit 1430, through audio and video connectors to a display and sound output device 1442 such as a monitor or television set having a display 1444 and one or more loudspeakers 1446. The audio connectors 1450 may include conventional analogue and digital outputs whilst the video connectors 1452 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 1428. The Playstation 3 device's operating system supports Dolby® 5.1 surround sound, Dolby® Theatre Surround (DTS), and the decoding of 7.1 surround sound from Blu-Ray® disks.

In one embodiment, the video camera 1412 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 1400. The camera LED indicator may be arranged to illuminate in response to appropriate control data from the system unit 1400, for example to signify adverse lighting conditions. Embodiments of the video camera 1412 may variously connect to the system unit 1400 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs. In another embodiment the camera is an infrared camera suitable for detecting infrared light.

In general, in order for successful data communication to occur with a peripheral device such as a video camera or remote control via one of the communication ports of the system unit 1400, an appropriate piece of software such as a device driver should be provided. Device driver technology is well-known and will not be described in detail here, except to say that the skilled man will be aware that a device driver or similar software interface may be required in the present embodiment described.

Figure 9:
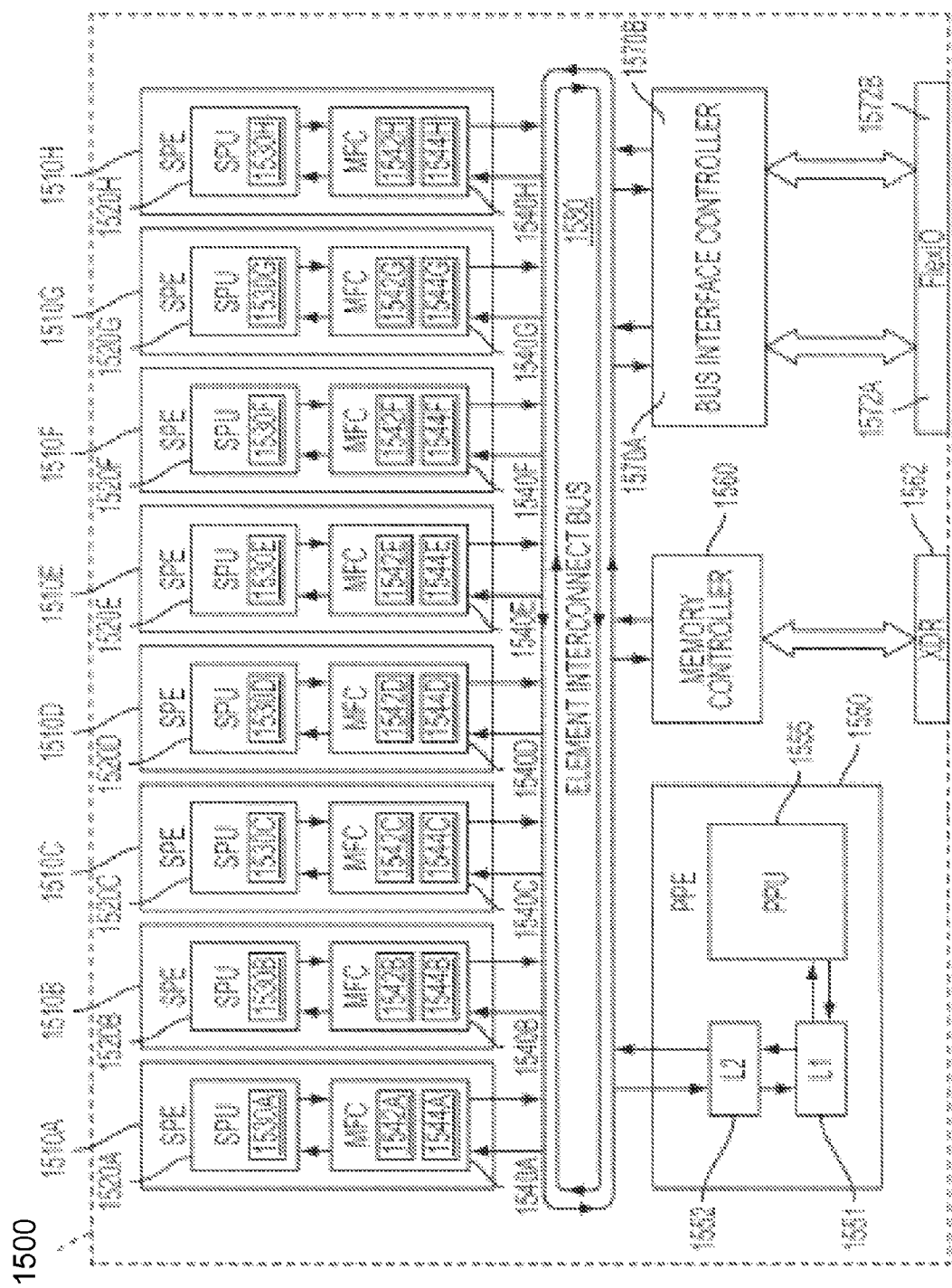
FIG. 9 illustrates additional hardware that may be used to process instructions, in accordance with one embodiment of the present invention.

FIG. 9 illustrates additional hardware that may be used to process instructions, in accordance with one embodiment of the present invention. FIG. 9 illustrates the components of a cell processor 1500, which may correspond to cell processor 1428 of FIG. 8, in accordance with one embodiment of the present invention. The cell processor 1500 of FIG. 9 has an architecture comprising four basic components: external input and output structures comprising a memory controller 1560 and a dual bus interface controller 1570A, B; a main processor referred to as the Power Processing Element 1550; eight co-processors referred to as Synergistic Processing Elements (SPEs) 1510A-H; and a circular data bus connecting the above components referred to as the Element Interconnect Bus 1580. The total floating point performance of the Cell processor is 218 GFLOPS, compared with the 6.2 GFLOPs of the Playstation 2 device's Emotion Engine.

The Power Processing Element (PPE) 1550 is based upon a two-way simultaneous multithreading Power 1470 compliant PowerPC core (PPU) 1555 running with an internal clock of 3.2 GHz. It comprises a 512 kB level 2 (L2) cache and a 32 kB level 1 (L1) cache. The PPE 1550 is capable of eight single position operations per clock cycle, translating to 25.6 GFLOPs at 3.2 GHz. The primary role of the PPE 1550 is to act as a controller for the Synergistic Processing Elements 1510A-H, which handle most of the computational workload. In operation the PPE 1550 maintains a job queue, scheduling jobs for the Synergistic Processing Elements 1510A-H and monitoring their progress. Consequently each Synergistic Processing Element 1510A-H runs a kernel whose role is to fetch a job, execute it and synchronize it with the PPE 1550.

Each Synergistic Processing Element (SPE) 1510A-H comprises a respective Synergistic Processing Unit (SPU) 1520A-H, and a respective Memory Flow Controller (MFC) 1540A-H comprising in turn a respective Dynamic Memory Access Controller (DMAC) 1542A-H, a respective Memory Management Unit (MMU) 1544A-H and a bus interface (not shown). Each SPU 1520A-H is a RISC processor clocked at 3.2 GHz and comprising 256 kB local RAM 1530A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 1520A-H does not directly access the system memory XDRAM 1426; the 64-bit addresses formed by the SPU 1520A-H are passed to the MFC 1540A-H which instructs its DMA controller 1542A-H to access memory via the Element Interconnect Bus 1580 and the memory controller 1560.

The Element Interconnect Bus (EIB) 1580 is a logically circular communication bus internal to the Cell processor 1500 which connects the above processor elements, namely the PPE 1550, the memory controller 1560, the dual bus interface 1570A,B and the 8 SPEs 1510A-H, totaling 12 participants. Participants can simultaneously read and write to the bus at a rate of 8 bytes per clock cycle. As noted previously, each SPE 1510A-H comprises a DMAC 1542A-H for scheduling longer read or write sequences. The EIB comprises four channels, two each in clockwise and anti-clockwise directions. Consequently for twelve participants, the longest step-wise data-flow between any two participants is six steps in the appropriate direction. The theoretical peak instantaneous EIB bandwidth for 12 slots is therefore 96B per clock, in the event of full utilization through arbitration between participants. This equates to a theoretical peak bandwidth of 307.2 GB/s (gigabytes per second) at a clock rate of 3.2 GHz.

The memory controller 1560 comprises an XDRAM interface 1562, developed by Rambus Incorporated. The memory controller interfaces with the Rambus XDRAM with a theoretical peak bandwidth of 25.6 GB/s.

The dual bus interface 1570A,B comprises a Rambus FlexIO® system interface 1572A,B. The interface is organized into 12 channels each being 8 bits wide, with five paths being inbound and seven outbound. This provides a theoretical peak bandwidth of 62.4 GB/s (36.4 GB/s outbound, 26 GB/s inbound) between the Cell processor and an I/O Bridge via controller 1570A and a Reality Simulator graphics unit via controller 1570B.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer implemented method of calibrating a tracking system, comprising:
   receiving positional data of a tracked object from an optical sensor by a computing device;
   computing a first angle of the object with respect to an optical axis of the optical sensor based on the received positional data;
   receiving inertial data corresponding to the object by the computing device;
   based on the inertial data, determining a second angle of an orientation of the object with respect to a plane normal to gravity; and
   in response to a calibrate command from a user, determining a pitch of the optical sensor based on both the computed first angle and the determined second angle.

2. The method of claim 1, wherein the second angle is computed from the inertial data by the computing device.

3. The method of claim 1, wherein the calibrate command is received while the user holds the object at a momentarily fixed position or orientation.

4. The method of claim 1, wherein the first angle is computed based on a focal length of the optical sensor and a vertical distance between the object and the optical axis in an image taken by the optical sensor.

5. The method of claim 4, further comprising:
   computing a relative yaw between the optical sensor and the object based on the focal length, the determined pitch of the optical sensor and a horizontal distance between the object and the optical axis in the image.

6. The method of claim 1, further comprising:
   computing a relative yaw between the optical sensor and the object concurrent to computing the pitch of the optical sensor, wherein the pitch and the yaw are computed by:
   determining a first three dimensional vector that points from the optical axis to a center of the object in a reference frame of the optical sensor;

determining a second three dimensional vector that points from the optical axis to the center of the object in a world reference frame that has an axis aligned with gravity;

computing a three dimensional rotation between the first vector and the second vector; and decomposing the three dimensional rotation into a first two dimensional rotation that represents the pitch of the optical sensor and a second two dimensional rotation that represents the relative yaw between the optical sensor and the object.

7. A computer readable storage medium including instructions that, when executed by a processing system, cause the processing system to perform a method comprising:

receiving positional data of a tracked object from an optical sensor by a computing device;

computing a first angle of the object with respect to an optical axis of the optical sensor based on the received positional data;

receiving inertial data corresponding to the object by the computing device;

based on the inertial data, determining a second angle of an orientation of the object with respect to a plane normal to gravity; and in response to a calibrate command from a user, determining a pitch of the optical sensor based on both the computed first angle and the computed second angle.

8. The computer readable storage medium of claim 7, wherein the second angle is computed from the inertial data by the computing device.

9. The computer readable storage medium of claim 7, wherein the calibrate command is received while the user holds the object at a momentarily fixed position or orientation.

10. The computer readable storage medium of claim 7, wherein the first angle is computed based on a focal length of the optical sensor and a vertical distance between the object and the optical axis in an image taken by the optical sensor.

11. The computer readable storage medium of claim 10, the method further comprising:

computing a relative yaw between the optical sensor and the object based on the focal length, the determined pitch of the optical sensor and a horizontal distance between the object and the optical axis in the image.

12. The computer readable storage medium of claim 7, the method further comprising:

computing a relative yaw between the optical sensor and the object concurrent to computing the pitch of the optical sensor, wherein the pitch and the yaw are computed by:

determining a first three dimensional vector that points from the optical axis to a center of the object in a reference frame of the optical sensor;

determining a second three dimensional vector that points from the optical axis to the center of the object in a world reference frame that has an axis aligned with gravity;

computing a three dimensional rotation between the first vector and the second vector; and decomposing the three dimensional rotation into a first two dimensional rotation that represents the pitch of the optical sensor and a second two dimensional rotation that represents the relative yaw between the optical sensor and the object.

13. A tracking system, comprising:

a tracked object that includes one or more inertial sensors, the tracked object to gather inertial data, and to transmit the inertial data to a computing device;

the optical sensor, to gather positional data of the tracked object as the object is pointed approximately toward the optical sensor, and to transmit the positional data to the computing device; and the computing device, to receive the inertial data and the positional data, to compute a first angle of the object with respect to an optical axis of the optical sensor based on the received positional data, to compute a second angle of an orientation of the object with respect to a plane normal to gravity from the inertial data, and in response to a calibrate command from a user, to determine a pitch of the optical sensor based on both the computed first angle and the computed second angle.

14. The tracking system of claim 13, wherein the calibrate command is received while the user holds the object at a momentarily fixed position or orientation.

15. The tracking system of claim 13, wherein the computing device to compute the first angle based on a focal length of the optical sensor and a vertical distance between the object and the optical axis in an image taken by the optical sensor.

16. The tracking system of claim 15, the computing device further to compute a relative yaw between the optical sensor and the object based on the focal length, the computed pitch and a horizontal distance between the object and the optical axis in the image.

17. The tracking system of claim 13, the computing device further to compute a relative yaw between the optical sensor and the object concurrent to computing the pitch of the optical sensor, wherein the pitch and the yaw are computed by:

determining a first three dimensional vector that points from the optical axis to a center of the object in a reference frame of the optical sensor;

determining a second three dimensional vector that points from the optical axis to the center of the object in a world reference frame that has an axis aligned with gravity;

computing a three dimensional rotation between the first vector and the second vector; and decomposing the three dimensional rotation into a first two dimensional rotation that represents the pitch of the optical sensor and a second two dimensional rotation that represents the relative yaw between the optical sensor and the object.

18. The method of claim 4, wherein the first angle is computed based on a ratio of the vertical distance to the focal length, wherein the first angle is computed as an arctangent of the ratio.

* * * * *